(12) United States Patent
Takeuchi et al.

(10) Patent No.: US 11,365,977 B2
(45) Date of Patent: Jun. 21, 2022

(54) ROUTE GENERATION DEVICE, ROUTE GENERATION METHOD AND TRAVEL CONTROL DEVICE

(71) Applicant: Mitsubishi Electric Corporation, Tokyo (JP)

(72) Inventors: Yu Takeuchi, Tokyo (JP); Tomoki Uno, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 11 days.

(21) Appl. No.: 16/980,863

(22) PCT Filed: Mar. 26, 2018

(86) PCT No.: PCT/JP2018/011998
§ 371 (c)(1),
(2) Date: Sep. 15, 2020

(87) PCT Pub. No.: WO2019/186617
PCT Pub. Date: Oct. 3, 2019

(65) Prior Publication Data
US 2021/0003410 A1 Jan. 7, 2021

(51) Int. Cl.
*G01C 21/34* (2006.01)
*G01C 21/00* (2006.01)
(Continued)

(52) U.S. Cl.
CPC ....... *G01C 21/3415* (2013.01); *B62D 15/021* (2013.01); *B62D 15/0255* (2013.01); *G01C 21/3863* (2020.08); *G01S 19/42* (2013.01)

(58) Field of Classification Search
CPC ........... G01C 21/3415; G01C 21/3863; B62D 15/021; B62D 15/0255
(Continued)

(56) References Cited

FOREIGN PATENT DOCUMENTS

| DE | 10 2006 040 334 A1 | 3/2008 |
|----|---|---|
| DE | 10 2010 002 067 A1 | 8/2011 |

(Continued)

OTHER PUBLICATIONS

International Search Report and Written Opinion dated Jun. 26, 2018 for PCT/JP2018/011998 filed on Mar. 26, 2018, 10 pages including English Translation of the International Search Report.
(Continued)

*Primary Examiner* — Isaac G Smith
(74) *Attorney, Agent, or Firm* — Xsensus LLP

(57) ABSTRACT

A route generation device and a travel control device for suppressing a target route of a vehicle to be discontinuous before and after starting a lane change are obtained. A position obtaining unit obtains location information of the vehicle. A first route extraction unit extracts the target route as first points in sequence assuming that the vehicle continues to travel in the lane in which the vehicle is traveling before starting the lane change. The second route extraction unit extracts the target route a target route as second points in sequence assuming that the vehicle is currently traveling in an adjacent lane in which the vehicle travels after completing the lane change, and the vehicle continues to travel in the adjacent lane. The route calculation unit calculates the third points representing the target route.

20 Claims, 15 Drawing Sheets

(51) Int. Cl.
  *B62D 15/02* (2006.01)
  *G01S 19/42* (2010.01)
(58) Field of Classification Search
  USPC .......................................... 701/41, 410, 411
  See application file for complete search history.

(56) References Cited

FOREIGN PATENT DOCUMENTS

| | | | |
|---|---|---|---|
| JP | 2008-149855 A | | 7/2008 |
| JP | 2008149855 A | * | 7/2008 |
| JP | 2009-040267 A | | 2/2009 |
| JP | 2015-058890 A | | 3/2015 |
| JP | 2017-081425 A | | 5/2017 |
| JP | 2017081425 A | * | 5/2017 |
| JP | 2018-017713 A | | 2/2018 |
| WO | 2017/047261 A1 | | 3/2017 |

OTHER PUBLICATIONS

German Office Action dated Apr. 29, 2021 in German Application No. 11 2018 007 128.6.

* cited by examiner

US 11,365,977 B2

ROUTE GENERATION DEVICE, ROUTE GENERATION METHOD AND TRAVEL CONTROL DEVICE

CROSS-REFERENCE TO RELATED APPLICATION

The present application is based on PCT filing PCT/JP2018/011998, filed Mar. 26, 2018, the entire contents of which are incorporated herein by reference.

TECHNICAL FIELD

The present disclosure relates to a route generation device for generating a target route of a vehicle when the vehicle changes a travelling lane, a route generation method, and a travel control device for controlling the travel of the vehicle on the basis of the generated target route.

BACKGROUND ART

In recent years, various techniques for controlling the travel of a vehicle have been proposed. As one of them, a device for controlling a lane change when a vehicle moves from a currently traveling lane to an adjacent lane has been developed. For example, the device described in Patent Document 1 calculates a target passage position of a user's vehicle during a course change on the basis of the obtained location information of the user's vehicle. Subsequently, the next target passage position is calculated by assuming the calculated target passage position as the user's vehicle position. By successively repeating this, the target route of the user's vehicle when its course is to be changed is generated.

PRIOR ART DOCUMENT

Patent Document

Patent Document 1: Japanese Unexamined Patent Application Publication No. 2008-149855

SUMMARY OF THE INVENTION

Problem to be Solved by the Invention

The device disclosed in Patent Literature 1 calculates the target passage position on the basis of the position of the user's vehicle when the target route is to be generated. However, the position of the user's vehicle may deviate from the target route which is set before the start of the lane change owing to such factors as: the influence of disturbance that the user's vehicle receives from the surrounding environment such as the road surface condition and wind; the influence of the error in the obtained location information of the user's vehicle; and the influence of vehicle control error. In the device disclosed in Patent Literature 1, when the lane change is started, if the position of the user's vehicle is not on the target route set before the lane change is started, the target route set before the lane change is started and the target route after starting the lane change is discontinuous, so that the behavior of the user's vehicle may be unstable.

The present disclosure has been made to solve the above problem, an object is to obtain a route generation device, a route generation method, and a travel control device that prevent the target route of the vehicle from becoming discontinuous before and after the start of the lane change.

Solution to the Problem

A route generation device and a travel control device according to the present disclosure each include:

a position obtaining unit to obtain location information of the vehicle;

a first route extraction unit to extract, on the basis of the location information of the vehicle and map information obtained from outside, a target route as first points in sequence on an assumption that the vehicle continues to travel in a lane in which the vehicle is traveling before starting the lane change;

a second route extraction unit to extract, on the basis of the location information of the vehicle and the map information, a target route as second points in sequence on an assumption that the vehicle is currently traveling in an adjacent lane in which the vehicle travels after completing the lane change, and the vehicle continues to travel in the adjacent lane; and a route calculation unit to calculate the target route when the vehicle makes the lane change as third points in sequence on the basis of the first points in sequence and the second points in sequence, wherein the route calculation unit generates a plurality of reference points on one of a line connecting the first points in sequence and a line connecting the second points in sequence, generates a plurality of corresponding points in one-to-one correspondence to the reference points on the other one of the line connecting the first points in sequence and the line connecting the second points in sequence, and generates each point to be included in the third points in sequence as a target point on a line connecting one of the reference points and one of the corresponding points which correspond to each other.

A route generation method according to the present disclosure includes:

a step of obtaining location information of the vehicle;

a step of extracting, on the basis of the location information of the vehicle and map information obtained from outside, a target route as first points in sequence, on an assumption that the vehicle continues to travel in a lane in which the vehicle is traveling before starting the lane change;

a step of extracting, on the basis of the location information of the vehicle and the map information, a target route as second points in sequence on an assumption that the vehicle is currently traveling in an adjacent lane in which the vehicle travels after completing the lane change, and the vehicle continues to travel in the adjacent lane; and a step of calculating the target route when the vehicle makes the lane change as third points in sequence on the basis of the first points in sequence and the second points in sequence, wherein a step of calculating the target route as third points in sequence comprises:

a step of generating a plurality of reference points on one of a line connecting the first points in sequence and a line connecting the second points in sequence;

a step of generating a plurality of corresponding points in one-to-one correspondence to the reference points on the other one of the line connecting the first points in sequence and the line connecting the second points in sequence; and a step of generating each point to be included in the third points in sequence as a target point on a line connecting one of the reference points and one of the corresponding points which correspond to each other.

Advantageous Effects

According to this disclosure, it is possible to obtain a route generation device, a route generation method, and a travel control device that prevent the target route of a vehicle from becoming discontinuous between the times before and after the start of the lane change.

DESCRIPTION OF EMBODIMENTS

Embodiment 1

Figure 1:
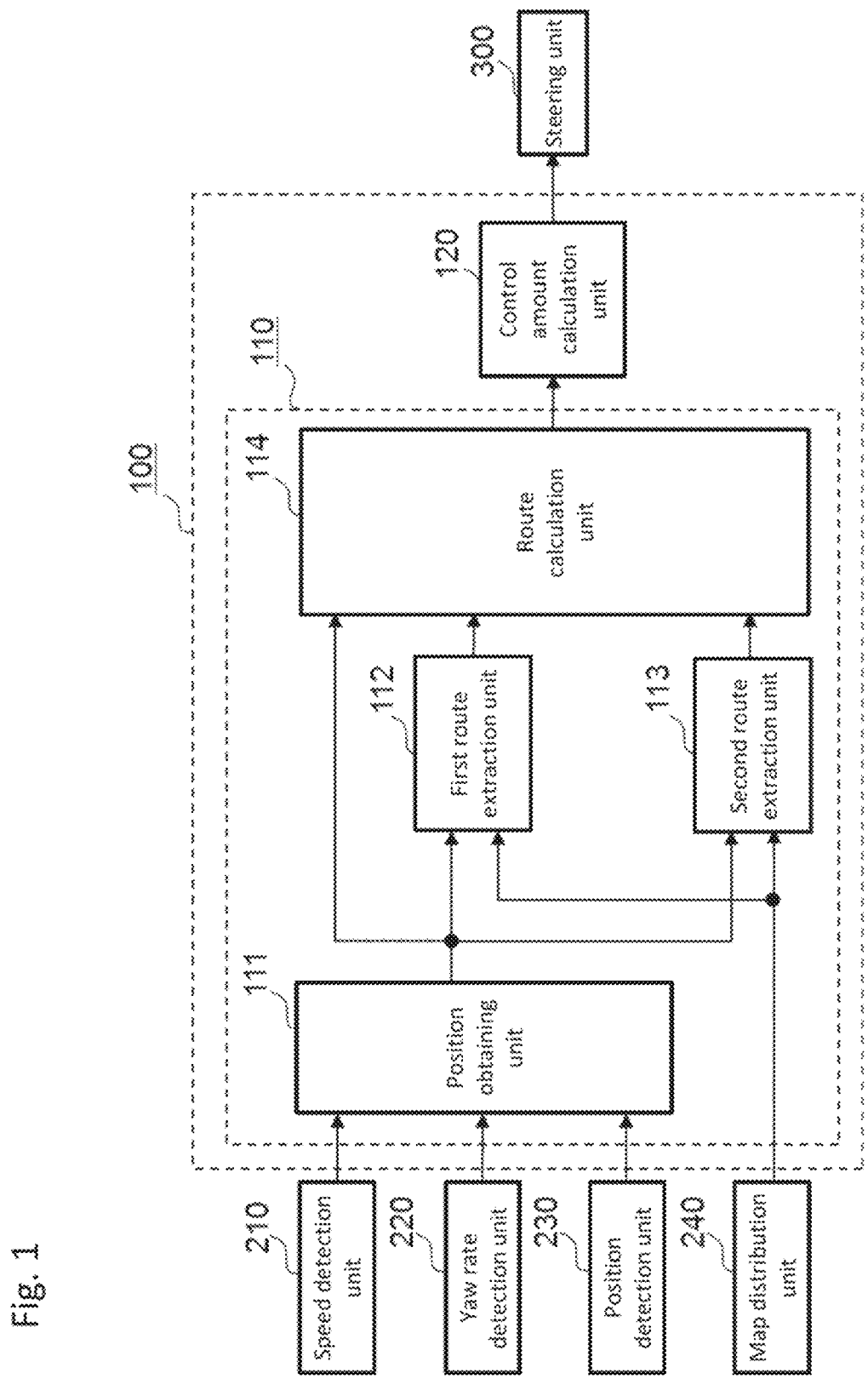
FIG. 1 is a block diagram showing an example of a schematic configuration of a route generation device and a travel control device according to Embodiment 1 of the present disclosure.
Figure 2:
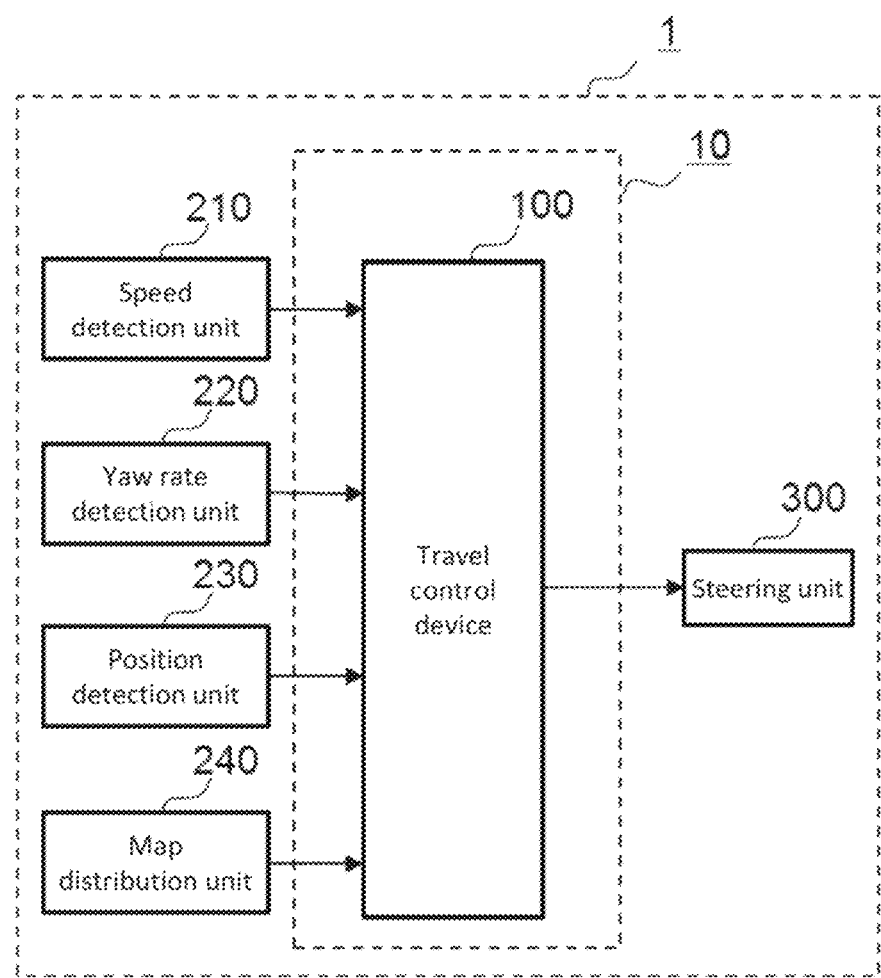
FIG. 2 is a block diagram showing an example of a schematic configuration in which the travel control device according to Embodiment 1 of the present disclosure is installed on a user's vehicle.

FIG. 1 is a block diagram showing an example of a schematic configuration of a route generation device 110 and a travel control device 100 according to Embodiment 1 of the present disclosure. FIG. 2 is a block diagram showing an example of a schematic configuration in which the travel control device 100 according to Embodiment 1 of the present disclosure is mounted on a user's vehicle 1. The user's vehicle 1 is a vehicle to be controlled by the travel control device 100. The travel control system 10 is mounted on the user's vehicle 1 and controls traveling of the user's vehicle 1. The travel control system 10 may be an automatic driving system. The travel control device 100 is a part of the travel control system 10. The travel control device 100 receives an instruction from the travel control system 10 and controls the amount of steering when the user's vehicle 1 changes its travelling lane.

Here, the case where the lane in which the user's vehicle 1 is currently traveling is not the same as the lane in which it will travel in the future is regarded as a lane change of the user's vehicle. The case where the lane in which the user's vehicle 1 is traveling merges with another lane is also regarded as a lane change. Also note that, the term "current (or present)", here, indicates the time when the travel control device 100 starts its processing, namely, the time when the travel control device 100 starts the operation for the lane change. On the other hand, the term "future", here, refers to a point in time after the user's vehicle 1 has completed the lane change. FIG. 2 illustrates a case where the travel control device 100 is mounted on the user's vehicle 1. However, at least a part of the travel control device 100 may be installed outside the user's vehicle 1 while being connected with the user's vehicle via a network.

The travel control device 100 includes the route generation device 110 and a control amount calculation unit 120. The route generation device 110 generates a route when the user's vehicle 1 changes lanes. The route generation device 110 includes a position obtaining unit 111, a first route extraction unit 112, a second route extraction unit 113, and a route calculation unit 114. A speed detection unit 210, a yaw rate detection unit 220, a position detection unit 230, a map distribution unit 240, and a steering unit 300 are connected to the travel control device 100. The speed detection unit 210, the yaw rate detection unit 220, the position detection unit 230, and the map distribution unit 240 are external devices that generate information to be inputted to the travel control device 100. The speed detection unit 210 is a vehicle speed sensor mounted on the user's vehicle 1, and detects the traveling speed of the user's vehicle 1. The yaw rate detection unit 220 is a yaw rate sensor mounted on the user's vehicle 1, and detects the yaw rate of the user's vehicle 1.

The position detection unit 230 is, for example, a GPS receiver including a global positioning system (GPS) antenna, and receives information from a satellite, detects the two-dimensional location information as well as the direction-of-travel of the user's vehicle 1. As another example, the position detection unit 230 can be realized by combining a laser imaging detection and ranging (LiDAR) and map information. As yet another example, the position detection unit 230 can be realized by combining a GPS receiver, a LiDAR, and map information. The map distribution unit 240 distributes information of a high precision map around the user's vehicle 1. Here, the high precision map holds the coordinates of points in sequence on the center line of each lane of the road. The points in sequence form the route of the user's vehicle 1 in the case of the travelling in each lane. Note that the points in sequence held by the high precision map are not limited to the points in sequence representing the center line of each lane, and may be any points in sequence that serve as the target route when the user's vehicle 1 travels in each lane.

Figure 3:
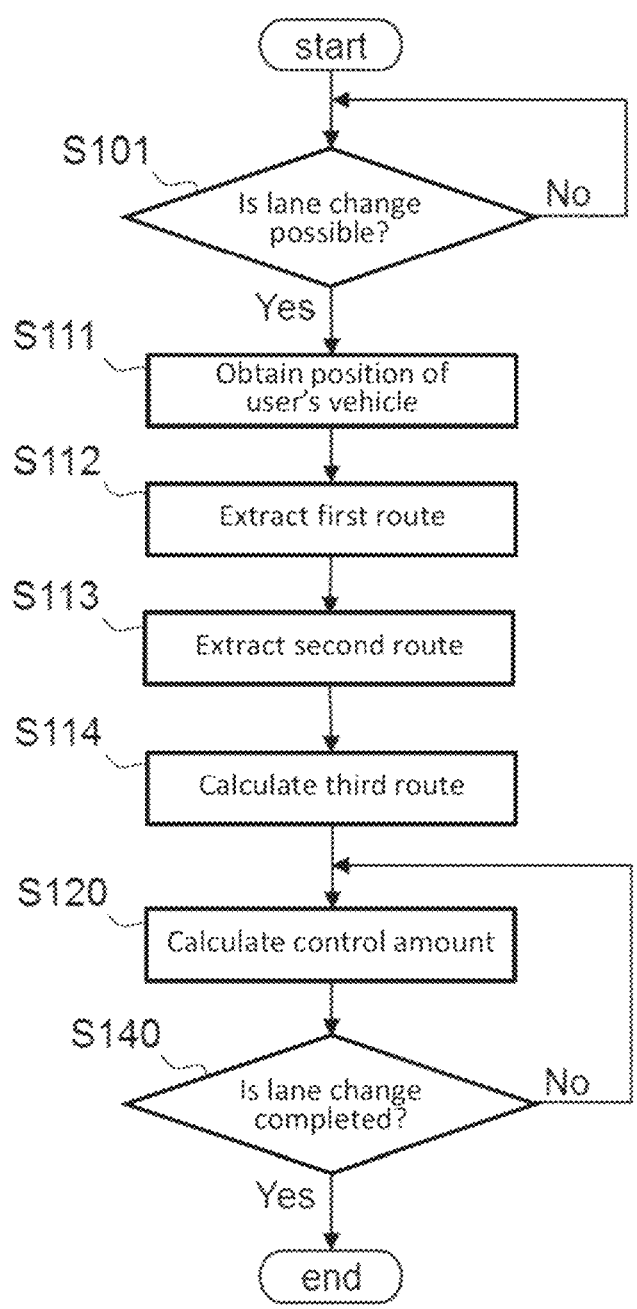
FIG. 3 is a flowchart showing an example of the operation flow of the route generation device and the travel control device according to Embodiment 1 of the present disclosure.

Next, operation of the route generation device 110 and the travel control device 100 will be described. FIG. 3 is a flowchart showing an example of an operation flow of the route generation device 110 and the travel control device 100 of Embodiment 1. Hereinafter, the operation of the route generation device 110 and the travel control device 100 will be described also using FIG. 3. As described above, the travel control device 100 is a part of the travel control system 10 that controls the traveling of the user's vehicle 1, and starts operating in response to an instruction from the travel control system 10.

First, in Step S101, the travel control device 100 determines whether it is possible to change lanes from the lane in which the user's vehicle 1 is currently traveling to an adjacent lane. The travel control device 100 determines that the lane cannot be changed, for example, in the following cases; when there is an obstacle vehicle around the user's vehicle 1; when there is no lane next to the lane where the user's vehicle 1 is currently traveling; and when changing lanes is prohibited by the driver. If it is determined in Step S101 that the lane cannot be changed, the operation of the travel control device 100 returns to Step S101. On the other hand, if it is determined in Step S101 that the lane can be changed, the operation of the travel control device 100 proceeds to Step S111.

Next, in Step S111, the position obtaining unit 111 obtains the location information of the user's vehicle 1 detected by the position detection unit 230, and corrects the obtained location information as necessary. The position detection unit 230 detects the location information of the user's vehicle 1 at predetermined time intervals. However, if the user's vehicle 1 has moved between the time when the position detection unit 230 detects the location information of the user's vehicle 1 and the present, the error of the location information generated by this movement may not be negligible in some cases. Therefore, the position obtaining unit 111 corrects the location information of the user's vehicle 1 detected by the position detection unit 230 on the basis of the traveling speed of the user's vehicle 1 detected by the speed detection unit 210 and the yaw rate of the user's vehicle 1 detected by the yaw rate detection unit 220, and outputs the corrected information as the current location information of the user's vehicle 1. That is, the position obtaining unit 111 corrects the location information of the user's vehicle 1 detected by the position detection unit 230 in consideration of the behavior of the user's vehicle 1, and outputs the corrected location information as the current location information of the user's vehicle 1. When the position detection unit 230 detects the location information of the user's vehicle 1 at time intervals short enough to ignore the movement of the user's vehicle 1, the position obtaining unit 111 does not need to correct the location information.

Next, in Step S112, the first route extraction unit 112 recognizes the lane in which the user's vehicle 1 is currently traveling on the basis of the location information of the user's vehicle 1 outputted from the position obtaining unit 111 and the information of the high precision map distributed from the map distribution unit 240. Hereinafter, the lane in which the user's vehicle 1 is currently traveling may be described as a driving lane. The driving lane is the lane in which the user's vehicle 1 travels before changing lanes. In Step S112, the first route extraction unit 112 extracts a first route. The first route is a target route on the assumption that the user's vehicle 1 keeps driving in the driving lane. As described above, the high precision map holds the coordinates of the points in sequence on the center line of each lane of the road. On the basis of the location information of the user's vehicle 1, the first route extraction unit 112 extracts the first route as the points in sequence by extracting the points in sequence on the center line of the driving lane from the information of the high precision map. The points in sequence representing the first route are called first points in sequence. Each point of the first points in sequence is a target passage point of the user's vehicle 1 assuming that the user's vehicle 1 continues travelling in the driving lane in the future. Since the user's vehicle 1 is controlled to travel along the line connecting the first points in sequence, the line connecting the first points in sequence may be regarded as the first route.

Next, in Step S113, the second route extraction unit 113 recognizes a lane, adjacent to the current lane of the user's vehicle 1, in which the user's vehicle 1 is to travel after changing lanes. The recognition is performed based on the location information of the user's vehicle 1 outputted from the position obtaining unit 111 and the information of the high precision map distributed from the map distribution unit 240. Hereinafter, the lane in which the user's vehicle 1 travels after changing lanes may be described as the adjacent lane. In Step S113, the second route extraction unit 113 extracts a second route. The second route is a target route on the assumption that the user's vehicle 1 is traveling in the adjacent lane at present and that the user's vehicle 1 continues to travel in the adjacent lane after the present time. On the basis of the location information of the user's vehicle 1, the second route extraction unit 113 extracts the second route as the points in sequence by extracting the points in sequence on the center line of the adjacent lane from the information of the high precision map. The points in sequence representing the second route are called second points in sequence. Each point in the second points in sequence is a target passage point of the user's vehicle 1 assuming that the user's vehicle 1 continues to travel in the adjacent lane after the present time. Since the user's vehicle 1 is controlled to travel along the line connecting the second points in sequence, the line connecting the second points in sequence may be regarded as the second route.

Next, in Step S114, the route calculation unit 114 calculates a target route when the lane on which the user's vehicle 1 travels is to be changed on the basis of the location information of the user's vehicle 1 outputted from the position obtaining unit 111, the first points in sequence representing the first route extracted by the first route extraction unit 112, and the second points in sequence representing the second route extracted by the second route extraction unit 113. The target route when the lane on which the user's vehicle 1 travels is to be changed is called a third route. The route calculation unit 114 calculates the third route as the points in sequence by calculating the positions of the points in sequence of the target passage points when the lane on which the user's vehicle 1 travels is to be changed. The points in sequence representing the third route is called third points in sequence. Since the user's vehicle 1 is controlled to travel along the line connecting the third points in sequence, the line connecting the third points in sequence may be regarded as the third route. The third route is a target route from the start to the completion of the lane change by the user's vehicle 1. The third route is generated between the first route and the second route. Details of the operation of the route calculation unit 114 will be described later. The third route calculated by the route calculation unit 114 is an output from the route generation device 110. Therefore, the operation from Step S111 to Step S114 is the operation of the route generation device 110.

Next, in Step S120, the control amount calculation unit 120 obtains a control amount for controlling the steering in such a way that the user's vehicle 1 follows the third route obtained by the route calculation unit 114, and outputs the control amount to the steering unit 300. That is, the control amount calculation unit 120 obtains a target steering angle in such a way that the user's vehicle 1 can travel along the third route obtained by the route generation device 110, and outputs the target steering angle to the steering unit 300. Next, in Step S140, the travel control device 100 determines whether the lane change has been completed. If it is determined in step S140 that the lane change has not been completed, the operation of the travel control device 100 returns to step S120. Therefore, the operation of the control amount calculation unit 120 in Step S120 is repeatedly performed until the lane change is completed. On the other hand, if it is determined in Step S140 that the lane change has been completed, the operation of the travel control device 100 ends.

For example, in Step S140, the travel control device 100 can determine whether the lane change is completed by determining whether a predetermined time has elapsed since the start of the lane change. Alternatively, in Step S140, the travel control device 100 can determine whether the lane change is completed by determining whether the user's vehicle 1 has traveled a predetermined distance after the start of the lane change. Further alternatively, in Step S140, the travel control device 100 can determine whether the lane change is completed by using the location information of the user's vehicle 1. The route generation device 110 and the travel control device 100 according to the present embodiment operate as described above.

The steering unit 300 is an external device receiving the target steering angle obtained by the travel control device 100. The steering unit 300 includes a steering mechanism having a motor, and a control circuit or a processor that controls the motor, and operates the motor on the basis of the target steering angle obtained by the travel control device 100 to control the lateral movement of the user's vehicle 1. Note that the lateral direction is a direction perpendicular to the direction-of-travel of the user's vehicle, and parallel to the road surface.

Figure 4:
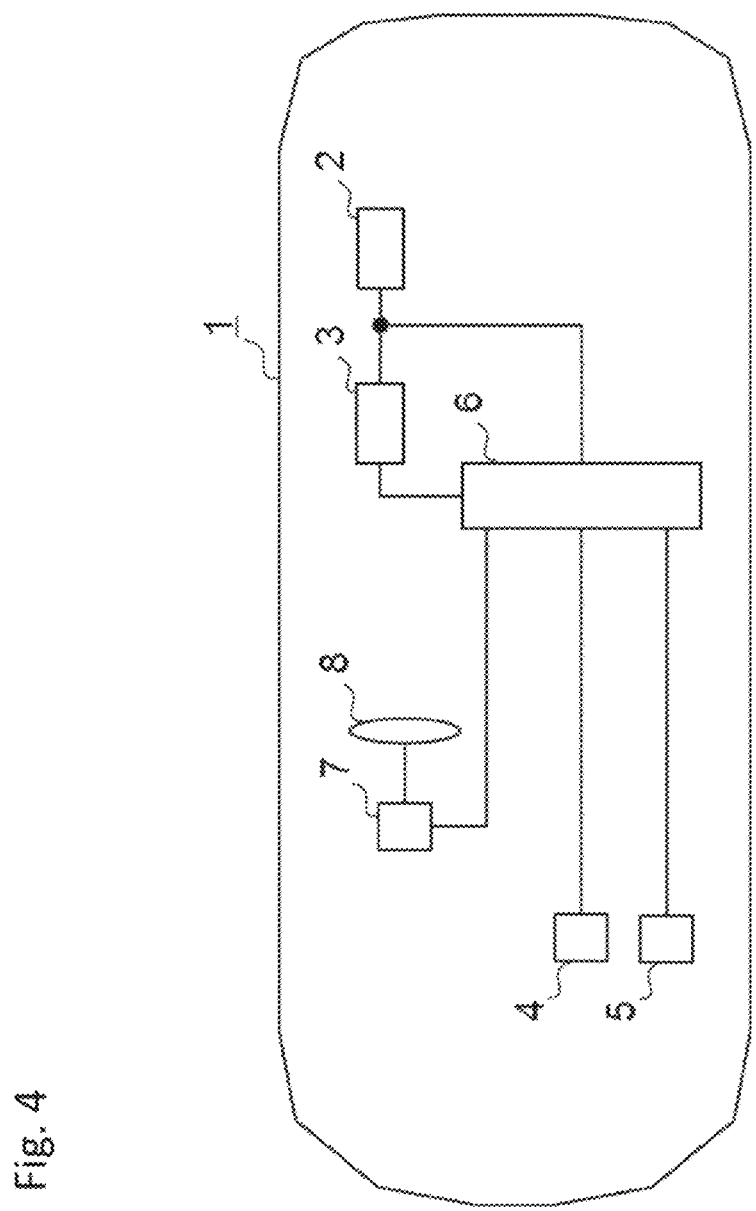
FIG. 4 is a diagram showing an example of a system configuration for realizing the route generation device and the travel control device according to Embodiment 1 of the present disclosure.

FIG. 4 is a diagram showing an example of a system configuration for realizing the route generation device 110 and the travel control device 100 according to Embodiment 1. The user's vehicle 1 includes a GPS receiver 2, a map distribution device 3, a speed sensor 4, a yaw rate sensor 5, a driving support ECU 6 (Electronic Control Unit), a steering ECU 7, and a steering mechanism 8. The GPS receiver 2 functions as the position detection unit 230. The GPS receiver 2 obtains satellite information via the GPS antenna, obtains the location information and the direction-of-travel information of the user's vehicle 1, and transmits the information to the map distribution device 3 and the driving support ECU 6. The speed sensor 4 functions as the speed detection unit 210. The speed sensor 4 detects the traveling speed of the user's vehicle 1 and transmits the traveling speed to the driving support ECU 6. The yaw rate sensor 5 functions as the yaw rate detection unit 220. The yaw rate sensor 5 detects the yaw rate of the user's vehicle 1 and transmits the yaw rate to the driving support ECU 6.

The map distribution device 3 functions as the map distribution unit 240. The map distribution device 3 transmits to the driving support ECU 6, map information around the user's vehicle 1 on the basis of the location information of the user's vehicle 1 received from the GPS receiver 2. As described above, the transmitted map information includes, at least, the coordinates of the points in sequence on the center line of each lane of the road around the user's vehicle 1. The driving support ECU 6 implements the functions of the travel control system 10 such as an advanced driver assistance system (ADAS) that controls the traveling of the user's vehicle 1. The functions implemented by the driving support ECU 6 include the functions of the travel control device 100. The driving support ECU 6 can be rephrased as ADAS-ECU. The driving support ECU 6 transmits a control command to the steering ECU 7 on the basis of the location information as well as the direction-of-travel information of the user's vehicle 1 obtained from GPS receiver 2, the traveling speed of the user's vehicle 1 obtained from the speed sensor 4, the yaw rate of the user's vehicle 1 obtained from the yaw rate sensor 5, and the map information obtained from the map distribution device 3. The steering ECU 7 and the steering mechanism 8 function as the steering unit 300. The steering ECU 7 controls the operation of the steering mechanism 8 on the basis of the control command from the driving support ECU 6, and controls the lateral movement of the user's vehicle 1.

Figure 5:
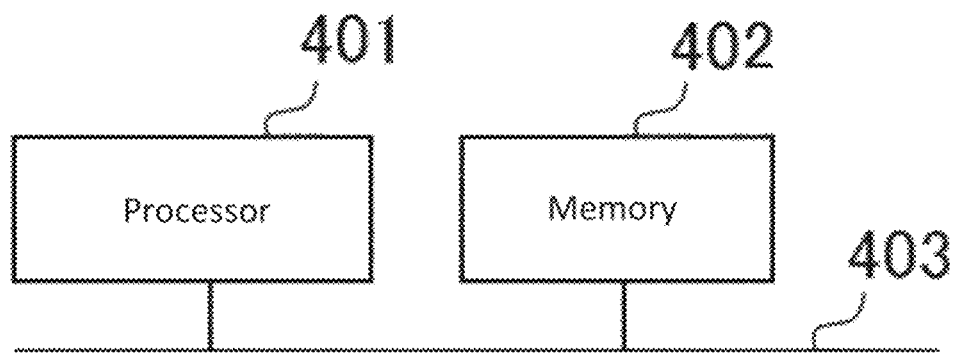
FIG. 5 is a diagram showing an example of a configuration of a driving support ECU and a steering ECU in the route generation device and the travel control device according to Embodiment 1 of the present disclosure.

FIG. 5 is a diagram showing an example of a configuration of each of the driving support ECU 6 and the steering ECU 7 in the route generation device 110 and the travel control device 100 according to Embodiment 1. In each of the driving support ECU 6 and the steering ECU 7, a processor 401 is connected to a memory 402 via a data bus 403. The processor 401 implements the function of the driving support ECU 6 or the steering ECU 7 by reading and executing the program stored in the memory 402. Note that the driving support ECU 6 and the steering ECU 7 may each include a dedicated electronic circuit additionally, or may each be configured only with a dedicated electronic circuit. That is, the driving support ECU 6 can be rephrased as a driving support circuit. Similarly, the steering ECU 7 can be rephrased as a steering circuit.

Figure 6:
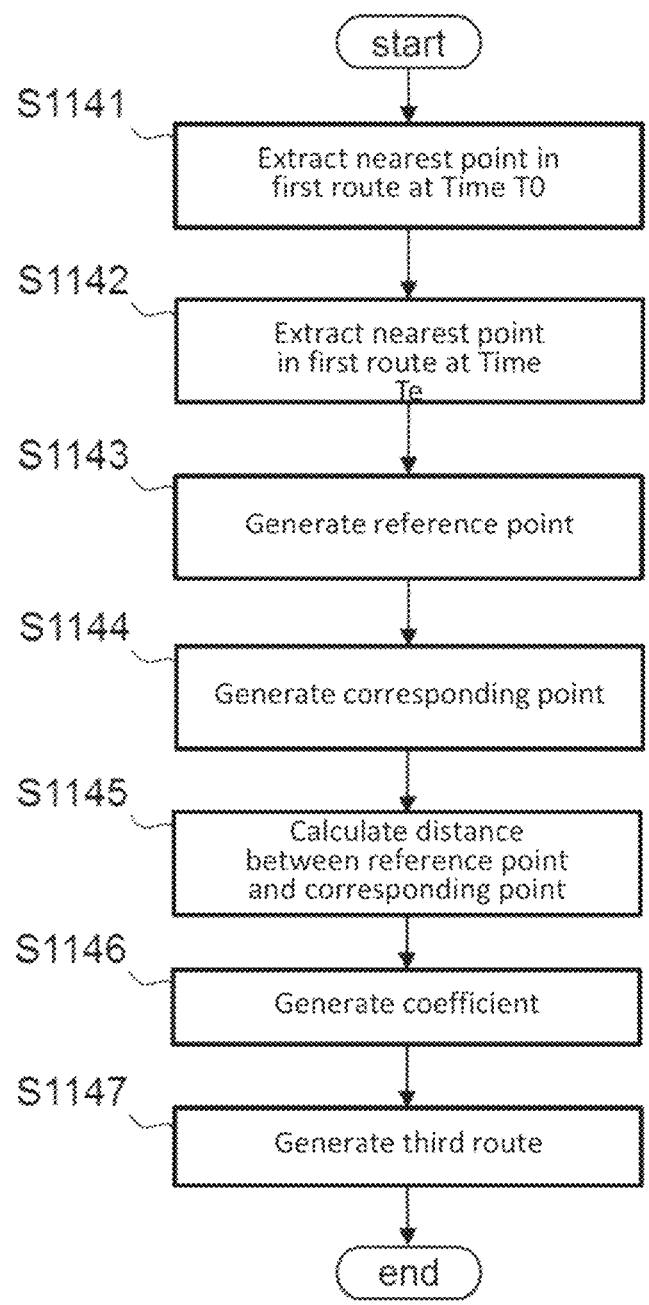
FIG. 6 is a flowchart showing an example of a flow of an operation of a route calculation unit in the route generation device according to Embodiment 1 of the present disclosure.
Figure 7:
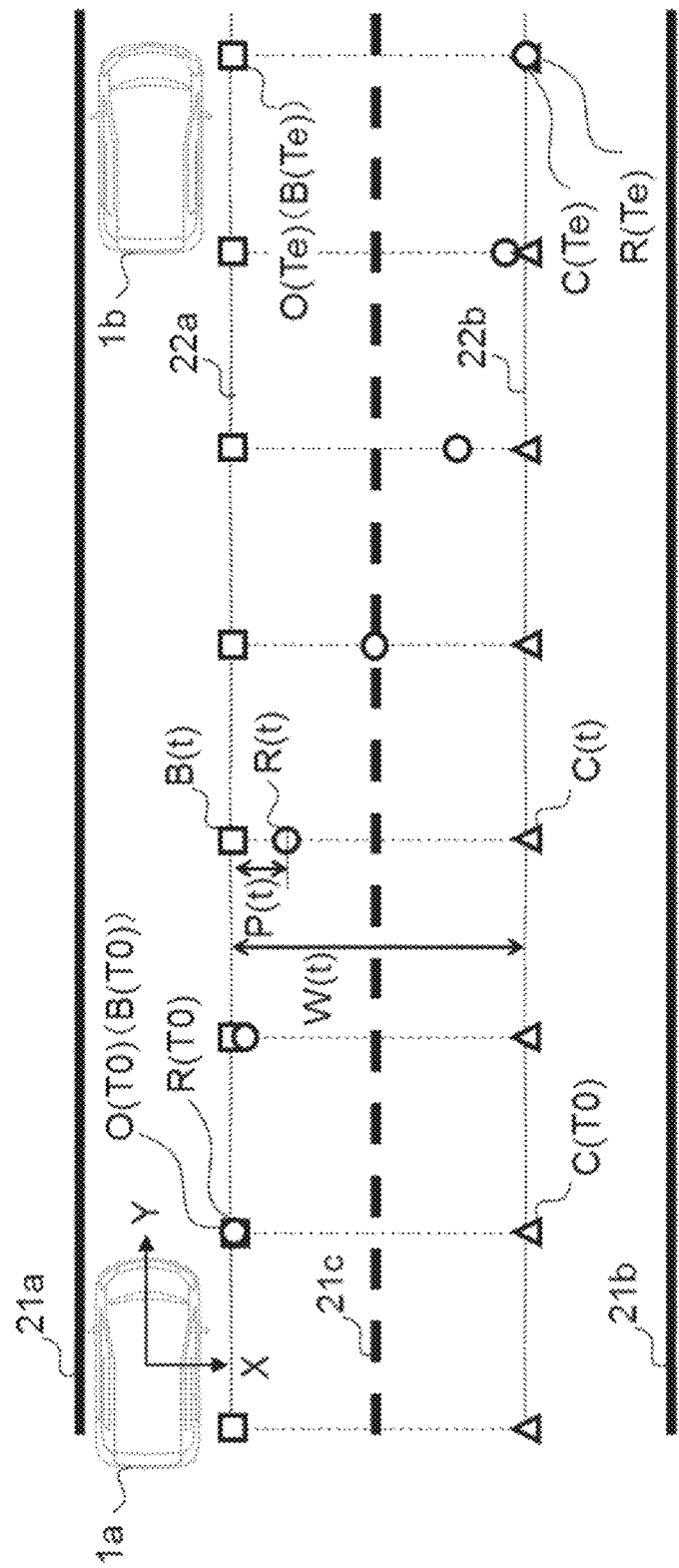
FIG. 7 is a plan view for explaining a route generated by the route calculation unit in the route generation device according to Embodiment 1 of the present disclosure.

Next, the operation of the route calculation unit 114 will be further described. FIG. 6 is a flowchart showing an example of an operation flow of the route calculation unit 114 in the route generation device 110 according to Embodiment 1. FIG. 6 is a flowchart showing a flow of the operation of the route calculation unit 114 in Step S114 of FIG. 3. FIG. 7 is a plan view for explaining a route generated by the route calculation unit 114 in the route generation device 110 according to Embodiment 1. In FIG. 7, +Y direction is the direction-of-travel of the user's vehicle 1 at the start of the lane change. +X direction is perpendicular to +Y direction and is the direction directed from the driving lane to the adjacent lane. In FIG. 7, the lane between the lane line 21*a* and the lane line 21*c* is the driving lane. The lane between the lane line 21*b* and the lane line 21*c* is the adjacent lane. Hereinafter, the operation of the route calculation unit 114 will be described referring to FIGS. 6 and 7. In the description, it is assumed that the variable representing time is t and the present time is set as t=0.

First, in Step S1141, the route calculation unit 114 obtains the position 1*a* when the user's vehicle 1 continues to travel in the driving lane from the present time to Time T0. That is, in Step S1141, the route calculation unit 114 obtains the position 1a when the user's vehicle 1 continues to travel along a first route 22a from the present time to Time T0. At this time, the route calculation unit 114 obtains, from the travel control system 10, information on the traveling speed of the user's vehicle 1 during the period from the present time to Time T0. Note that the position 1a of the user's vehicle 1 at Time T0 shown in FIG. 7 is shown as an aid to the explanation. Therefore, the position in X direction at the illustrated position 1a is not necessarily accurate. The position 1a is a position of a predetermined position of the user's vehicle 1. Time T0 is the time when the user's vehicle 1 starts the lane change. Therefore, the time from the present time to Time T0 is a waiting time until the user's vehicle 1 starts the lane change. The length of the waiting time is appropriately set by the travel control system 10. If Time T0 is set to 0, the user's vehicle 1 starts the lane change from the present time.

In Step S1141, the route calculation unit 114 extracts the nearest point O (T0) of the user's vehicle 1 at Time T0 from the first points in sequence representing the target passage points in the first route 22a. The nearest point O (T0) of the user's vehicle 1 at Time T0 is in the forward direction from the position 1a of the user's vehicle 1 at Time T0 and also is the nearest point to the position 1a. The forward direction, here, means the direction-of-travel of the user's vehicle 1 at that time. The forward direction at Time T0 is +X direction.

Next, in Step S1142, the route calculation unit 114 obtains the position 1b when the user's vehicle 1 continues to travel in the driving lane from the present time to Time Te. That is, in Step S1142, the route calculation unit 114 obtains the position 1b when the user's vehicle 1 continues to travel from the present time to Time Te along the first route 22a. At this time, the route calculation unit 114 obtains, from the travel control system 10, information on the traveling speed of the user's vehicle 1 during the period from the present time to the time Te. Note that the position 1b of the user's vehicle 1 at Time Te shown in FIG. 7 is shown as an aid to the explanation. Therefore, the position in X direction at the illustrated position 1b is not necessarily accurate. The position 1b is a position of a predetermined position of the user's vehicle 1. Time Te is the time at which the user's vehicle 1 completes the lane change. The length of time from when the user's vehicle 1 starts the lane change to when the lane change is completed is appropriately set by the travel control system 10. In Step S1142, the route calculation unit 114 extracts the nearest point O (Te) of the user's vehicle 1 at Time Te from the first points in sequence. The nearest point O (Te) of the user's vehicle 1 at Time Te is in the forward direction from the position 1b of the user's vehicle 1 at Time Te and also is the nearest point to the position 1b.

Next, in Step S1143, the route calculation unit 114 extracts a sequence of points located from the nearest point O (T0) at Time T0 to the nearest point O (Te) at Time Te out of the first points in sequence. Thus, the route calculation unit 114 generates a sequence of a reference point B (t). The reference point B (t) is the target passage point of the user's vehicle 1 at Time t between Time T0 and Time Te when the user's vehicle 1 travels on the first route 22a. The reference point B (t) can be obtained using the traveling speed of the user's vehicle 1. Note that O (T0) and B (T0) are the same point, and O (Te) and B (Te) are the same point.

Next, in Step S1144, for each of the extracted reference points B (t), the route calculation unit 114 extracts from the second points in sequence a point that is the nearest as a corresponding point C (t). Thus, the route calculation unit 114 generates the corresponding point C (t) corresponding to the reference point B (t). Note that, as with the first points in sequence, the second points in sequence represent the target passage points in a second route 22b. That is, the route calculation unit 114 extracts combinations of the two points being the nearest with each other out of the first points in sequence and the second points in sequence to set the reference point B (t) and the corresponding point C (t). For example, the route calculation unit 114 extracts the corresponding point C (T0) nearest to the reference point B (T0) from the second points in sequence, and associates the reference point B (T0) with the corresponding point C (T0). Also, the route calculation unit 114 extracts the corresponding point C (Te) nearest to the reference point B (Te) from the second points in sequence, and associates the reference point B (Te) with the corresponding point C (Te). As a result, the reference point B (t) and the corresponding point C (t) are in one-to-one correspondence.

Figure 8:
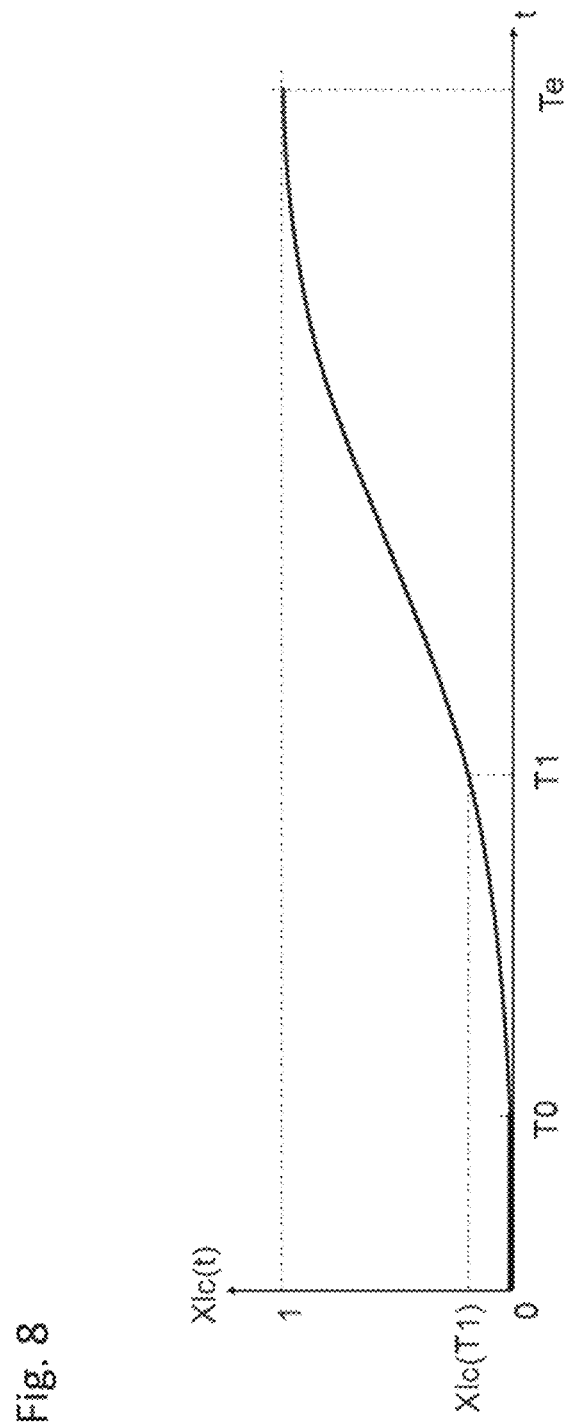
FIG. 8 is a diagram for explaining a coefficient generated by the route calculation unit in the route generation device according to Embodiment 1 of the present disclosure.

Next, in Step S1145, the route calculation unit 114 calculates a distance W (t) between the reference point B (t) and the corresponding point C (t) of the reference point B (t). The distance W (t) is obtained for each of the reference points B (t). Next, in Step S1146, the route calculation unit 114 generates a coefficient Xlc (t) for generating the third route. FIG. 8 is a diagram for explaining the coefficient Xlc (t) generated by the route calculation unit 114 in the route generation device 110 according to Embodiment 1. In FIG. 8, the horizontal axis represents Time t, and the vertical axis represents the magnitude of the coefficient Xlc (t).

The magnitude of the coefficient Xlc (t) changes in accordance with the elapsed time from when the user's vehicle 1 starts the lane change at Time T0 to when the user's vehicle 1 completes the lane change at Time Te. The locus of the change of the coefficient Xlc (t) with respect to the elapsed time from the start of the lane change by the user's vehicle 1 to the completion of the lane change is a clothoid curve. When the locus of the change is a clothoid curve, the coefficient Xlc (t) is called a clothoid coefficient. Also, when the locus of the change is a clothoid curve, the magnitude of the coefficient Xlc (t) is said to change in a clothoid manner with respect to the elapsed time. The coefficient Xlc (t) is 0 at Time T0 and 1 at Time Te.

Next, in Step S1147, the route calculation unit 114 calculates the positions of target points R (t) constituting the third points in sequence that are the target passage points when the user's vehicle 1 changes the driving lane. The route calculation unit 114 generates one target point R (t) for each of the reference points B (t). The route calculation unit 114 calculates the positions of the target points R (t) in such a way that each of the target points R (t) will be located on the line connecting the reference point B (t) and the corresponding point C (t) which correspond to each other. Further, the route calculation unit 114 calculates the position of R (t) in such a way that the distance P (t) between the reference point B (t) and the target point R (t) will be a distance represented by the following Equation (1).

[Equation 1]

$$P(t) = Xlc(t) \times W(t) \tag{1}$$

As a result, the ratio of the distance W (t) between the reference point B (t) and the corresponding point C (t) to the distance P (t) between the reference point B (t) and the target point R (t) changes in accordance with the elapsed time after the user's vehicle 1 starts the lane change. Then, the locus of the change is a clothoid curve. Since the coefficient Xlc (T0) at Time T0 is 0, the target point R (T0) at Time T0 matches the reference point B (T0) at Time T0. Also, since the coefficient Xlc (Te) at Time Te is 1, the corresponding point C (Te) at Time Te matches the target point R (Te) at Time Te.

The third points in sequence, which are a sequence of the target points R (t) each obtained as described above, constitute the third route which is the target route when the user's vehicle 1 changes the driving lane. In other words, the line connecting the third points in sequence is the third route. Here, as shown in FIG. 8, the magnitude of the coefficient Xlc (t) depends only on the elapsed time after the user's vehicle 1 starts the lane change, but not on the distance of the travel of the user's vehicle 1. Therefore, the distance required for the user's vehicle 1 to change lanes becomes longer when the traveling speed of the user's vehicle 1 is fast, and becomes shorter when the traveling speed of the user's vehicle 1 is slow. As a result, it is possible to generate an appropriate target route irrespective of the traveling speed of the user's vehicle 1.

Figure 9:
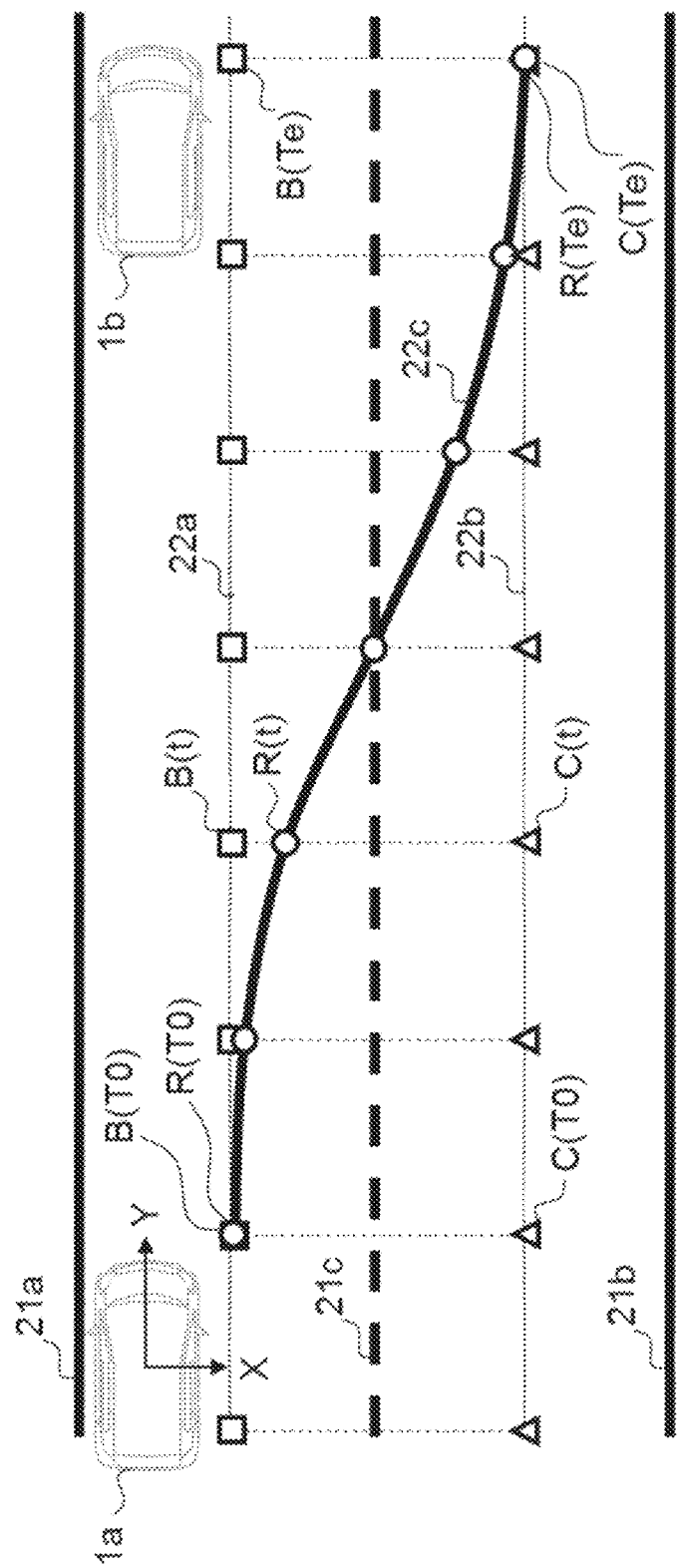
FIG. 9 is another diagram for explaining a route generated by the route calculation unit in the route generation device according to Embodiment 1 of the present disclosure.

FIG. 9 is another diagram for explaining a route generated by the route calculation unit 114 in the route generation device 110 according to Embodiment 1. FIG. 9 shows a third route 22c as a line connecting the third points in sequence. The route calculation unit 114 operates as described above. The route generation device 110 according to the present embodiment has a configuration in which the reference points B (t) are extracted from the first points in sequence, and the corresponding points C (t) are extracted from the second points in sequence. However, an opposite configuration below may also be used. That is, the route generation device 110 may be configured to extract the reference point Bs (t) from the second points in sequence and extract the corresponding points C (t) from the first points in sequence. In this case, the route calculation unit 114 calculates the position of the target point R (t) in such a way that the distance P (t) between the reference point B (t) and the target point R (t) will be a distance represented by the following Equation (2).

[Equation 2]

$$P(t) = -Xlc(t) \times W(t) \quad (2)$$

Further, the route generation device 110 according to the present embodiment has a configuration to extract the reference points B (t) from the first points in sequence but may have a configuration to generate the reference points B (t) separately from the first points in sequence. For example, the route generation device 110 may be so configured as to generate the reference points B (t) between the first points in sequence. The route generation device 110 according to the present embodiment may have the following configuration. That is, the reference points B (t) are generated so as to be located on one of the line connecting the first points in sequence and the line connecting the second points in sequence, and the corresponding points C (t) are generated so as to be located on the other line of the above two lines.

Figure 10:
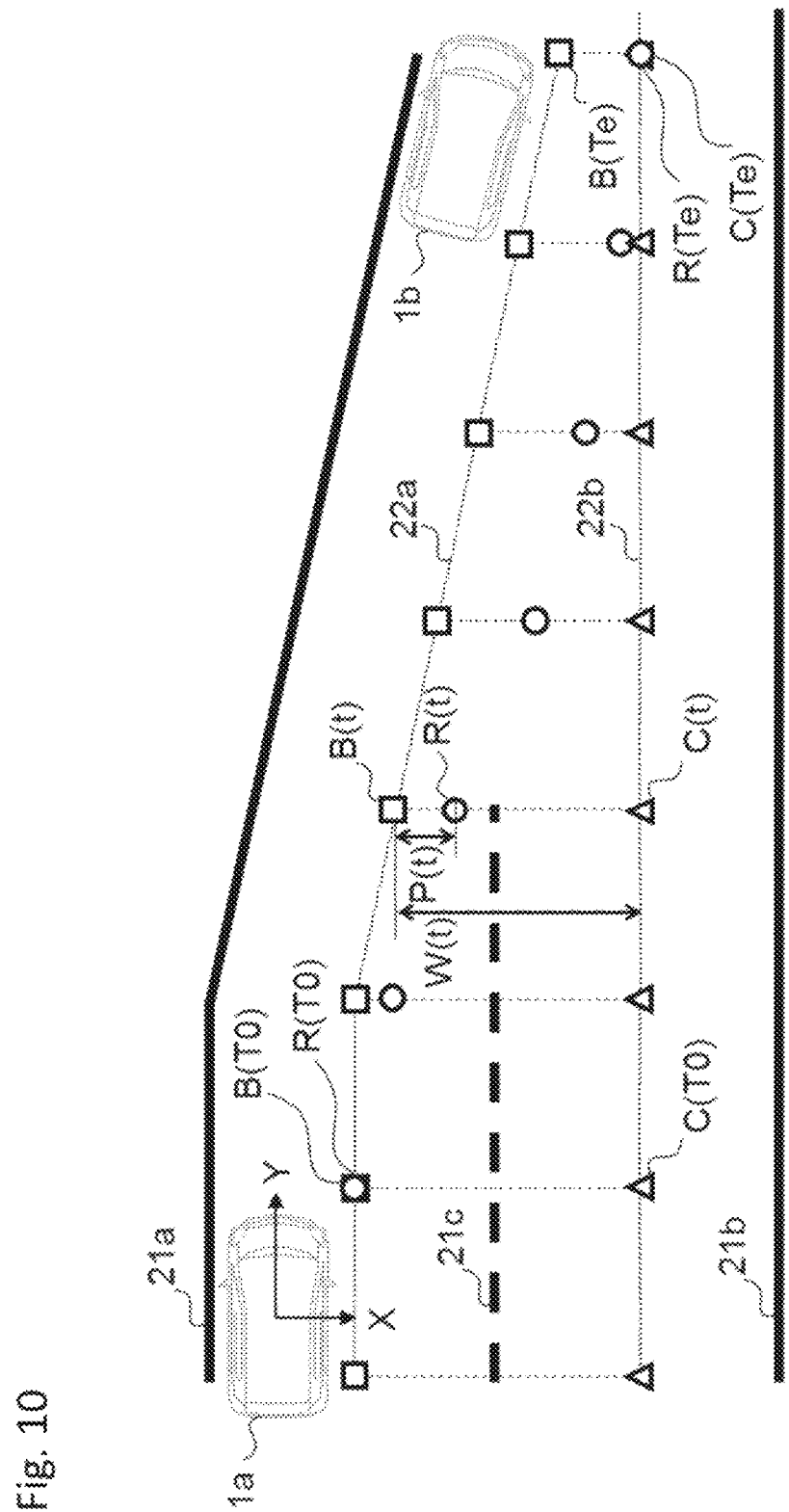
FIG. 10 is a plan view for explaining another example of a route generated by the route calculation unit in the route generation device according to Embodiment 1 of the present disclosure.

FIG. 10 is a plan view for explaining another example of a route generated by the route calculation unit 114 in the route generation device 110 according to Embodiment 1. In FIG. 10, those with the same reference numerals as those in FIG. 7 are the same. FIG. 10 shows a situation in which the distance between the first route and the second route changes as the user's vehicle 1 travels. For example, when the driving lane and the adjacent lane merge, the distance between the first route and the second route changes. The route generation device 110 according to the present embodiment generates a target route when the user's vehicle 1 changes lanes in such a way that the locus of the change in the ratio of the distance P (t) between the reference point B (t) and the target point R (t) to the distance W (t) between the reference point B (t) and the corresponding point C (t) will form a clothoid curve. Therefore, the route generation device 110 according to the present embodiment can easily generate a route that enables a vehicle to make a smooth lane change even in a situation where the distance between the first route and the second route changes as in FIG. 10. Thus, the travel control device 100 according to the present embodiment enables a vehicle to make a smooth lane change even in a situation where the distance between the first route and the second route changes as in FIG. 10.

The route generation device 110 and the travel control device 100 according to the present embodiment operate as described above. According to the route generation device 110 and the travel control device 100 of the present embodiment, the target route before starting the lane change and the target route after starting the lane change do not become discontinuous even if the position of the user's vehicle 1 is not on the target route before starting the lane change. Therefore, according to the route generation device 110 and the travel control device 100 of the present embodiment, the user's vehicle 1 can change lanes in a stable behavior.

For example, the position of the user's vehicle 1 may deviate from the target route in the following cases: when the road surface is partially uneven, when the vehicle is affected by a sudden crosswind, and when a steady lateral position deviation occurs on a road surface with a large cant. The route generation device 110 and the travel control device 100 according to the present embodiment generate the third route between the first route and the second route so as to connect the first route and the second route. Therefore, according to the route generation device 110 and the travel control device 100 of the present embodiment, the generated target routes do not become discontinuous even in the above cases. As a result, the user's vehicle 1 can change lanes smoothly, and the discomfort felt by the vehicle occupant is reduced.

Further, the route generation device 110 and travel control device 100 according to the present embodiment generate a target route in such a way that the ratio of the distance P (t) between the reference point B (t) and target point R (t) to the distance W (t) between the reference point B (t) and corresponding point C (t) will be changed in accordance with the elapsed time after the user's vehicle 1 starts the lane change. Therefore, according to the route generation device 110 and the travel control device 100 of the present embodiment, it is possible to change lanes by following an appropriate target route regardless of the traveling speed of the user's vehicle 1. Further, the route generation device 110 and the travel control device 100 according to the present embodiment generate a target route in such a way that the locus of the change in the ratio of the distances described above will be a clothoid curve. Therefore, the user's vehicle 1 can change lanes more smoothly.

Embodiment 2

It is conceivable that each point in the first points in sequence representing the first route may be displaced in the direction of travel of the user's vehicle 1 compared to each point in the second points in sequence representing the second route in some cases. Even in such a case, the route generation device can extract the sequence of the reference points B (t) from one of the first points in sequence and the second points in sequence. At this time, the route generation device obtains a straight line passing through a plurality of points included in the points in sequence of the other. Then, the foot of the vertical line drawn from the reference point B (t) to the obtained straight line can be generated as the corresponding point C (t).

The configurations of a route generation device 110 and a travel control device 100 according to Embodiment 2 of the present disclosure are the same as those shown in FIG. 1. The operation flows of the route generation device 110 and the travel control device 100 according to Embodiment 2 of the present disclosure are the same as those shown in FIGS. 3 and 6. The route generation device 110 and the travel control device 100 according to the present embodiment are different from the route generation device 110 and the travel control device 100 according to Embodiment 1 only in the generation method of the corresponding points C (t) shown in Step S1144 of FIG. 6.

Figure 11:
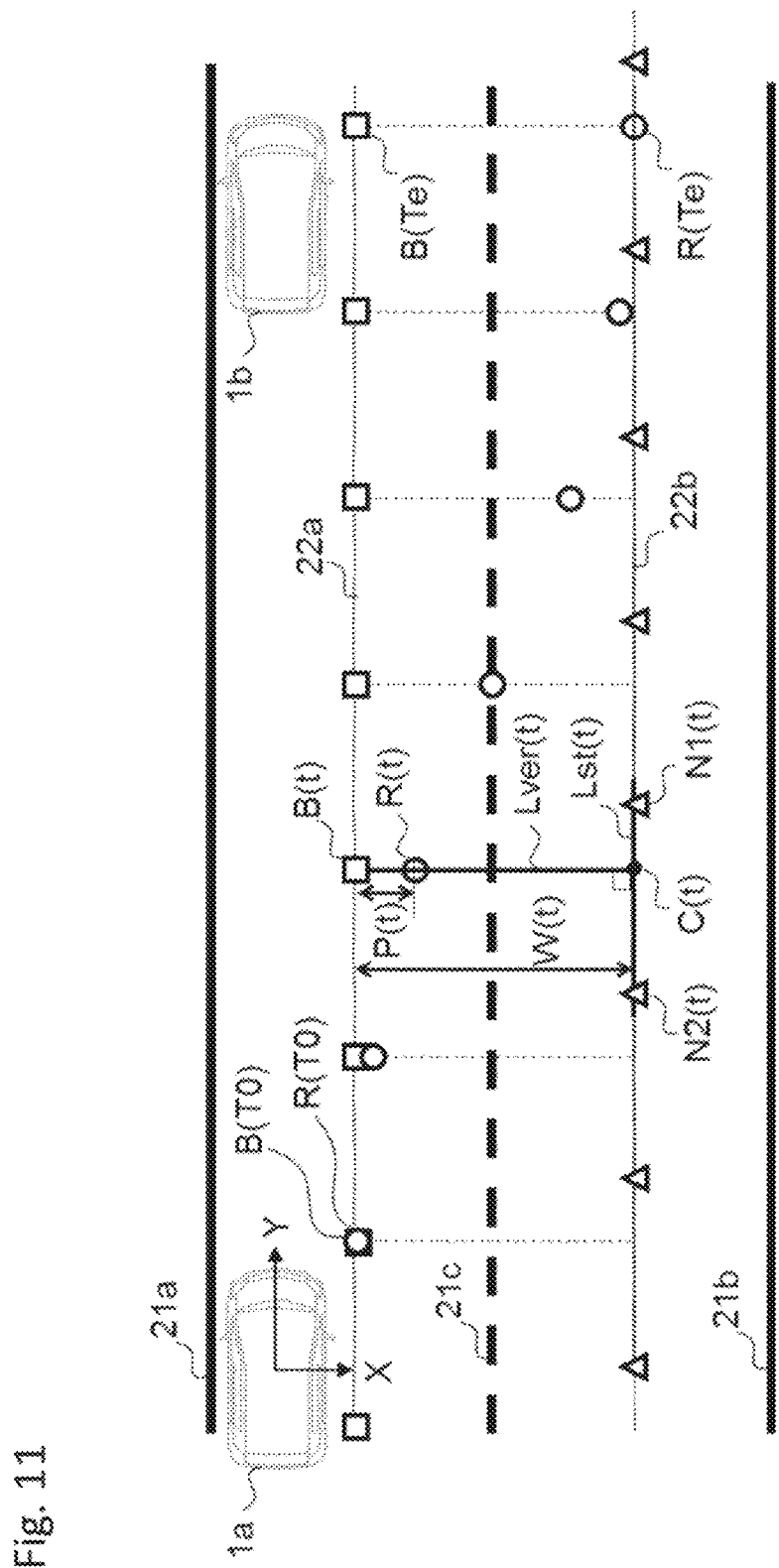
FIG. 11 is a plan view for explaining a route generated by a route calculation unit in a route generation device according to Embodiment 2 of the present disclosure.

FIG. 11 is a plan view for explaining a route generated by the route calculation unit 114 in the route generation device 110 according to Embodiment 2. In FIG. 11, +Y direction is the direction-of-travel of the user's vehicle 1 at the start of the lane change. +X direction, perpendicular to +Y direction, is the direction directed from the driving lane to the adjacent lane. In FIG. 11, those with the same reference numerals as those in FIG. 7 are the same. In FIG. 11, the lane between the lane line 21a and the lane line 21c is the driving lane, and the lane between the lane line 21b and the lane line 21c is the adjacent lane. FIG. 11 shows a case where the positions of the first points in sequence representing the first route 22a in Y direction are not aligned with the positions of the second points in sequence representing the second route 22b in Y direction. In Step S1143 of FIG. 6, the route calculation unit 114 generates a sequence of the reference points B (t) by extracting, from the first points in sequence, a sequence of points located between the nearest point O (T0) at Time T0 and the nearest point O (Te) at Time Te. This operation of the route calculation unit 114 is the same as the operation of the route calculation unit 114 according to Embodiment 1.

Figure 12:
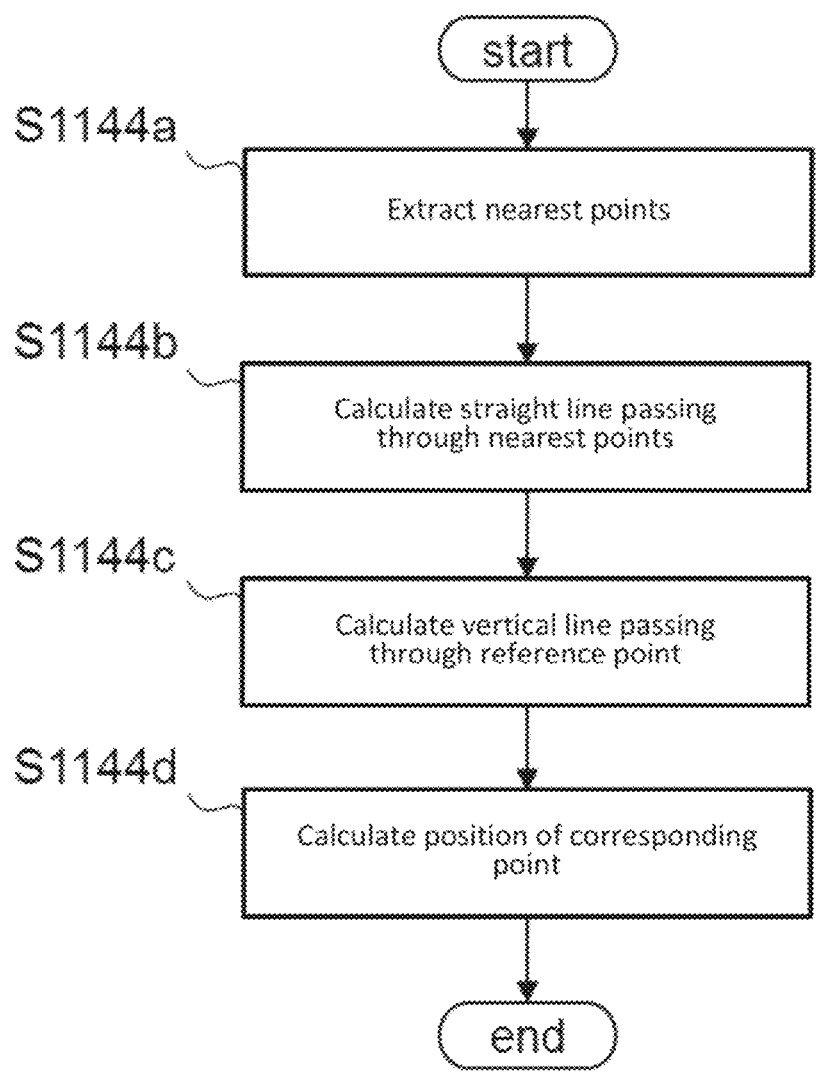
FIG. 12 is a flowchart showing an example of an operation flow in which the route calculation unit in the route generation device according to Embodiment 2 of the present disclosure obtains a corresponding point.

Next, in Step S1144, the route calculation unit 114 generates a corresponding point C (t) for each of the extracted reference points B (t). However, this operation is different from the operation of the route calculation unit 114 according to Embodiment 1. FIG. 12 is a flowchart showing an example of an operation flow in which the route calculation unit 114 in the route generation device 110 of Embodiment 2 obtains the corresponding point C (t). FIG. 11 shows details of the operation of the route calculation unit 114 in Step S1144 of FIG. 6. First, in Step S1144a, for each of the extracted reference points B (t), the route calculation unit 114 extracts, from the second points in sequence, two nearest points in order of proximity as near points N1 (t) and N2 (t). That is, the route calculation unit 114 extracts, from among the second points in sequence, the nearest point and the second nearest point to each of the extracted reference points B (t) as the near points N1 (t) and N2 (t), respectively.

Next, in Step S1144b, the route calculation unit 114 calculates a straight line Lst (t) passing through the near points N1 (t) and N2 (t). Next, in Step S1144c, the route calculation unit 114 calculates a vertical line Lver (t) drawn from the reference point B (t) to the straight line Lst (t). That is, the route calculation unit 114 calculates a straight line Lver (t) that passes through the reference point B (t) and intersects the straight line Lst (t) at a right angle. Next, in Step S1144d, the route calculation unit 114 obtains the intersection between the straight line Lst (t) and the vertical line Lver (t), and sets the obtained intersection as the corresponding point C (t). That is, the route calculation unit 114 generates, as the corresponding point C (t), the foot of the vertical line Lver (t) drawn from the reference point B (t) down to the straight line Lst (t). The above is the operation in which the route calculation unit 114 generates the corresponding point C (t) in the route generation device 110 according to the present embodiment. As shown in FIG. 11, when it is assumed that the line connecting the second points in sequence is the second route 22b, it can be said that the route calculation unit 114 generates the nearest point to the reference point B (t) on the second route 22b as the corresponding point C (t).

The operation of the route calculation unit 114 after obtaining the corresponding point C (t) is the same as the operation shown in FIG. 6. That is, the route calculation unit 114 calculates the distance W (t) between the reference point B (t) and the corresponding point C (t) in Step S1145, generates the coefficient Xlc (t) for generating the third route in Step S1146, and calculates the position of the target point R (t) constituting the third points in sequence in Step S1147. In the route generation device 110 and the travel control device 100 according to the present embodiment, the route calculation unit 114 operates as described above. Even if the position of each point of the first points in sequence representing the first route and the position of each point of the second points in sequence representing the second route are displaced, the route generation device 110 and the travel control device 100 according to the present embodiment can easily generate an optimal target route for the lane change. As a result, the discomfort of the passenger can be reduced. The route generation device 110 and the travel control device 100 according to the present embodiment also have the effects described in Embodiment 1.

Figure 13:
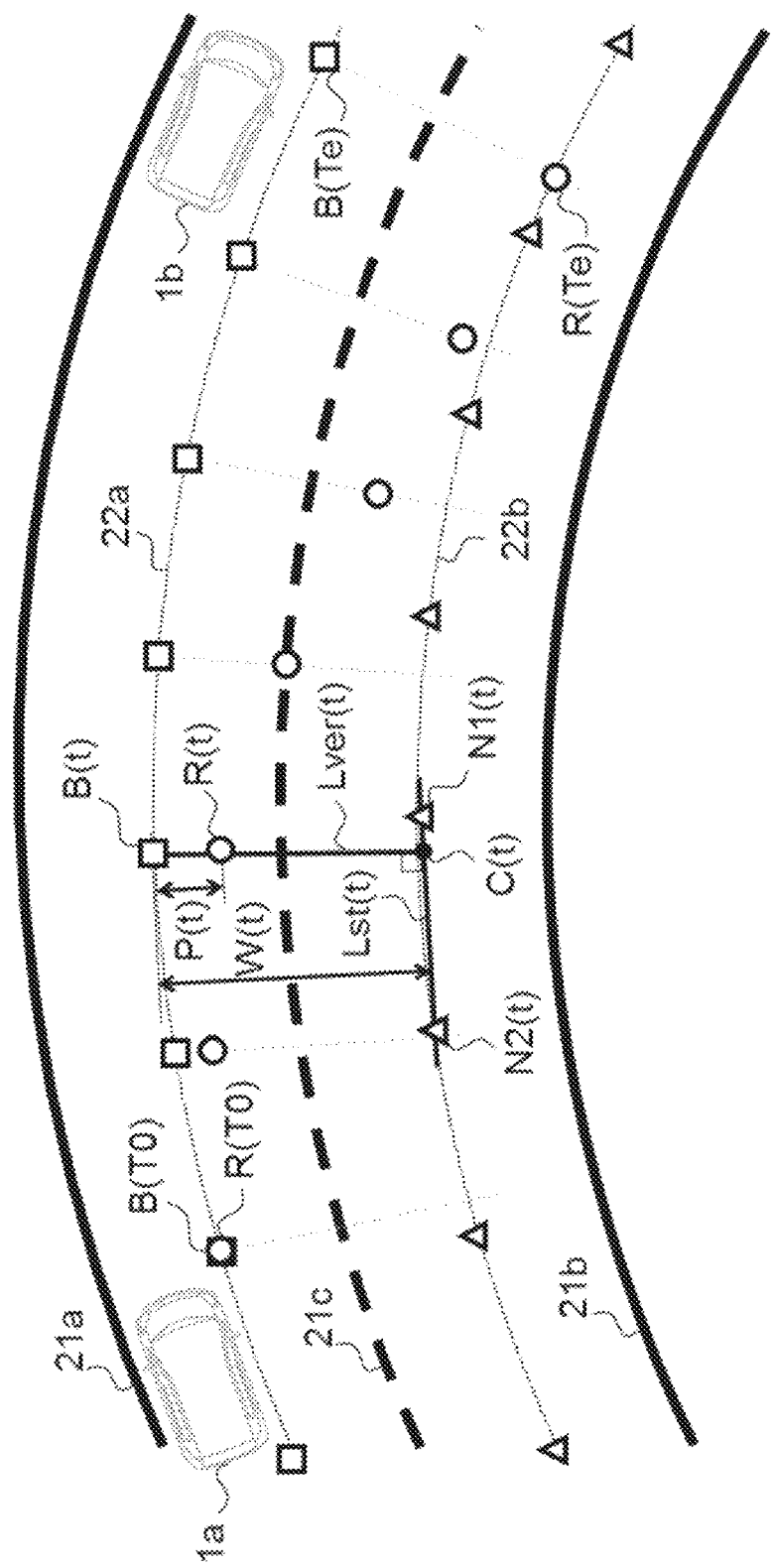
FIG. 13 is a plan view for explaining another example of a route generated by the route calculation unit in the route generation device according to Embodiment 2 of the present disclosure.

FIG. 13 is a plan view for explaining another example of a route generated by the route calculation unit 114 in the route generation device 110 according to Embodiment 2. In FIG. 13, those with the same reference numerals as those in FIG. 11 are the same. FIG. 13 is a plan view showing a target route generated by the route calculation unit 114 on a curved road. The operation of the route calculation unit 114 is as described above. FIG. 13 shows a case where the interval between points in the first points in sequence and the interval between points in the second points in sequence are the same on a curved road. In this case, as shown in the figure, the position of each point in the first points in sequence and the position of each point in the second points in sequence are displaced. This is because the first points in sequence are located in the outer side of the curve and the second points in sequence are located in the inner side of the curve. Even in such a case, the route generation device 110 and the travel control device 100 according to the present embodiment can easily generate an optimal target route along the curved-shape of the road.

Here, the second route 22b can be regarded as a curved line connecting the second points in sequence as illustrated in FIG. 13. Alternatively, the second route 22b can be regarded as a polygonal line connecting adjacent points of the second points in sequence with straight line segments. If the second route 22b is regarded as a polygonal line, the corresponding point C (t) will be located on the second route 22b. On the other hand, if the second route 22b is regarded as a curved line, the route calculation unit 114 according to the present embodiment generates on the second route 22b an approximate point of the nearest point to the reference point B (t) as the corresponding point C (t). In other words, it can be considered that the route calculation unit 114 according to the present embodiment approximates the nearest point to the reference point B (t) on the second route 22b and generates the nearest point as the corresponding point C (t).

The route calculation unit 114 may be configured so as to search for the nearest point to the reference point B (t) on the second route 22b, and use the searched point as the corresponding point C (t). Alternatively, the route calculation unit 114 may be configured so as to obtain the intersection between the vertical line Lver (t) and the second route 22b, and use the obtained intersection as the corresponding point C (t). Also, in the same manner as described in the route generation device 110 according to Embodiment 1, the route generation device 110 according to the present embodiment may also have a configuration in which the reference point B (t) is extracted from the second points in sequence and the near points N1 (t) and N2 (t) are extracted from the first points in sequence. Further, the route generation device 110 according to the present embodiment may also be configured so as to generate the reference point B (t) between any two of the first points in sequence.

Embodiment 3

In some cases, the arrangement interval between points included in the first points in sequence representing the first route may be different from the arrangement interval between points included in the second points in sequence representing the second route. In such a case, the route generation device can extract the sequence of the reference points B (t) from the points in sequence that have a larger number of points in a predetermined section out of the first points in sequence and the second points in sequence.

The configurations of the route generation device 110 and travel control device 100 according to Embodiment 3 of the present disclosure are the same as those shown in FIG. 1. The flows of the operations of the route generation device 110 and the travel control device 100 according to Embodiment 3 of the present disclosure are the same as those shown in FIG. 3, FIG. 6 and FIG. 12. The route generation device 110 and the travel control device 100 according to the present embodiment are different from the route generation device 110 and the travel control device 100 according to Embodiment 2 only in the generation method of the reference point B (t) shown in Step S1143 of FIG. 6.

Figure 14:
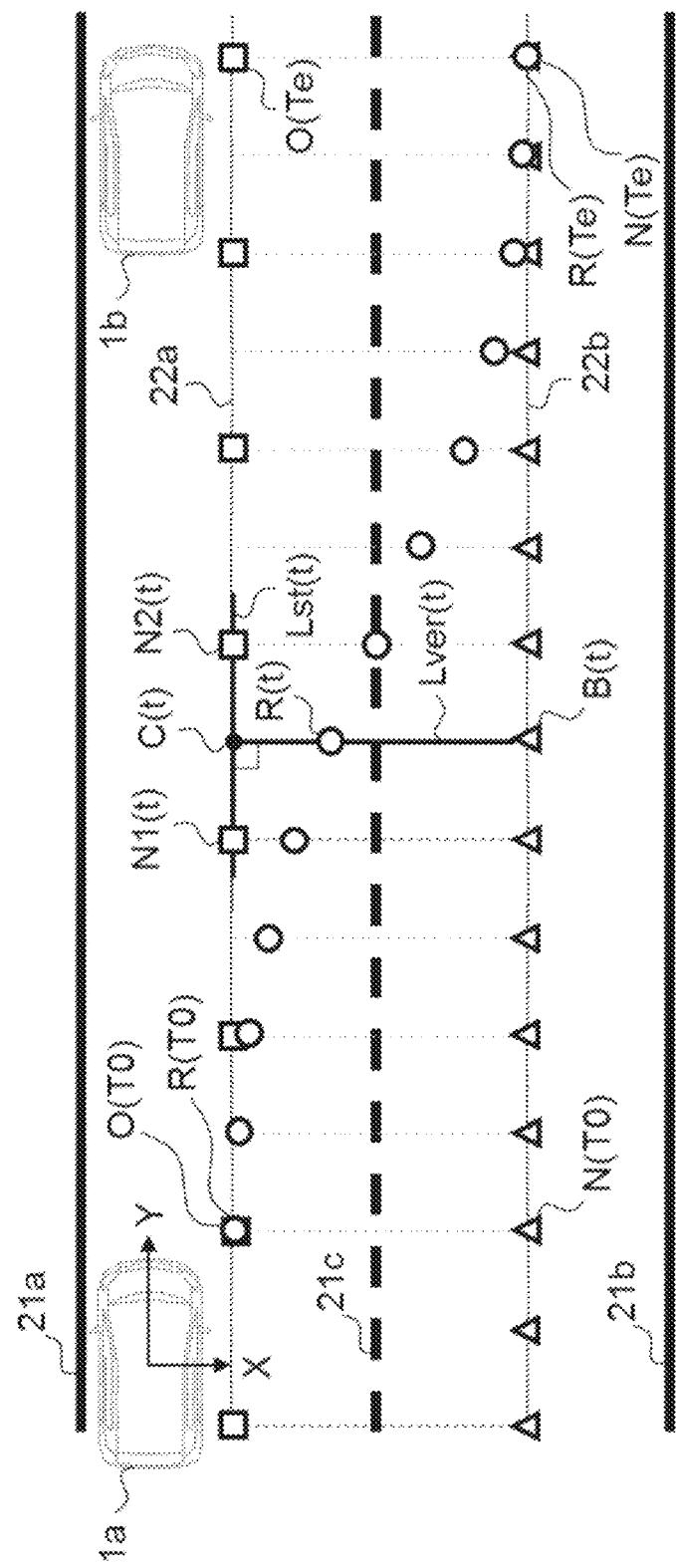
FIG. 14 is a plan view for explaining a route generated by a route calculation unit in a route generation device according to Embodiment 3 of the present disclosure.

FIG. 14 is a plan view for explaining a route generated by the route calculation unit 114 in the route generation device 110 according to Embodiment 3. In FIG. 14, +Y direction is the direction-of-travel of the user's vehicle 1 at the start of the lane change. +X direction, perpendicular to +Y direction, is the direction directed from the driving lane to the adjacent lane. In FIG. 14, those with the same reference numerals as those in FIG. 11 are the same. In FIG. 14, the lane between the lane line 21a and the lane line 21c is the driving lane, and the lane between the lane line 21b and the lane line 21c is the adjacent lane. FIG. 14 shows a case in which the arrangement interval between points included in the first points in sequence representing the first route 22a is different from the arrangement interval between points included in the second points in sequence representing the second route 22b.

In Step S1141 of FIG. 6, the route calculation unit 114 extracts the nearest point O (T0) of the user's vehicle 1 at Time T0 from the first points in sequence. In Step S1142, the route calculation unit 114 extracts the nearest point O (Te) of the user's vehicle 1 at Time Te from the first points in sequence. This operation of the route calculation unit 114 is the same as the operation of the route calculation unit 114 according to Embodiment 1. The nearest point O (T0) is the nearest point of the user's vehicle 1 in the first points in sequence at Time T0. The nearest point O (Te) is the nearest point of the user's vehicle 1 in the first points in sequence at Time Te. Next, in Step S1143, the route calculation unit 114 generates the reference point B (t). The operation of the route calculation unit 114 in Step S1143 is different from the operation of the route calculation unit 114 according to Embodiment 1.

Figure 15:
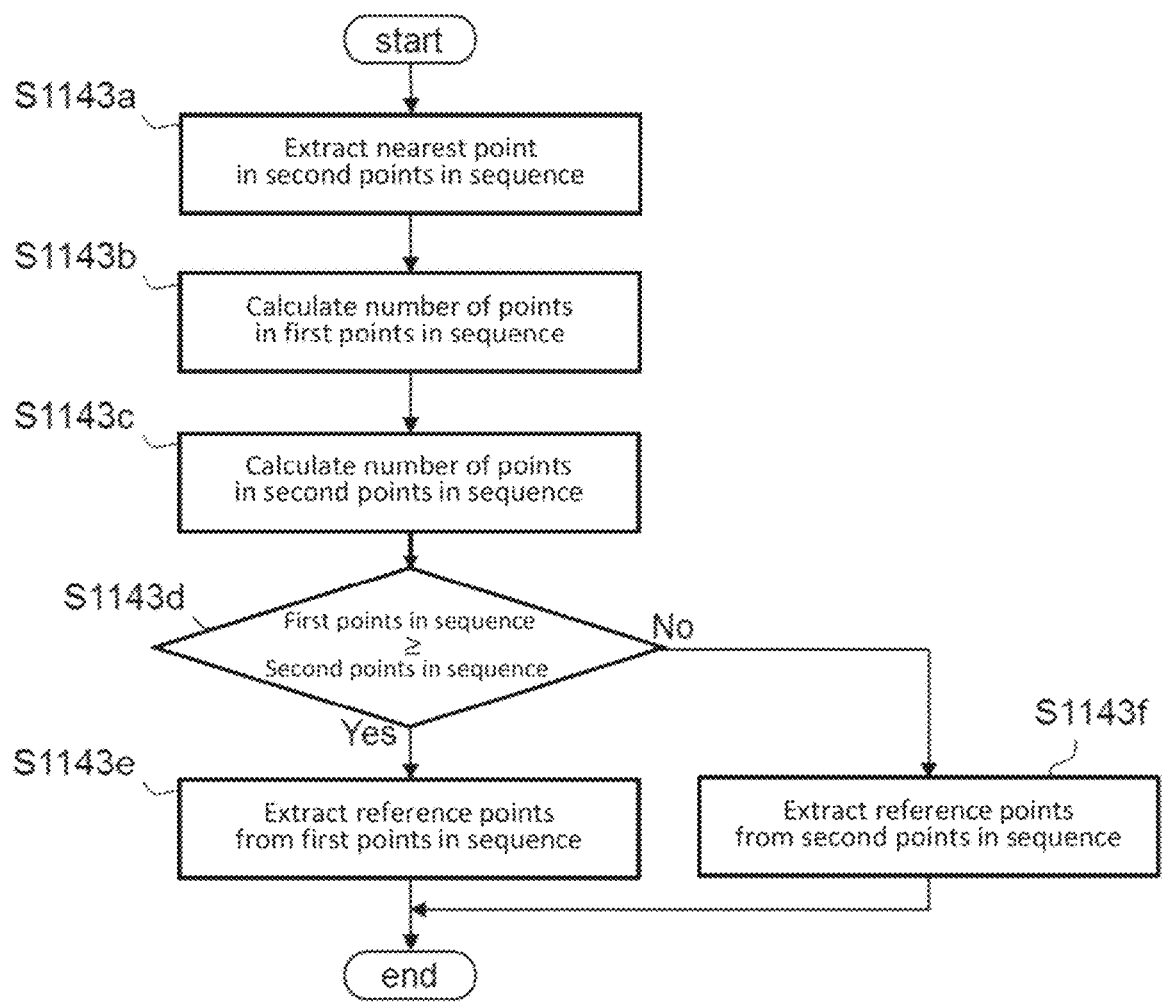
FIG. 15 is a flowchart showing an example of an operation flow in which the route calculation unit in the route generation device according to Embodiment 3 of the present disclosure obtains a reference point.

FIG. 15 is a flowchart showing an example of an operation flow in which the route calculation unit 114 obtains the reference point B (t) in the route generation device 110 according to Embodiment 3. FIG. 12 shows details of the operation of the route calculation unit 114 in Step S1143 of FIG. 6. First, in Step S1143a, the route calculation unit 114 extracts one point nearest to the nearest point O (T0) of the first points in sequence from the second points in sequence. Then, the extracted nearest point is set as the nearest point N (T0) of the second points in sequence at Time T0. Also, in Step S1143a, the route calculation unit 114 extracts one point nearest to the nearest point O (Te) of the first points in sequence from the second points in sequence. Then, the extracted nearest point is set as the nearest point N (Te) of the second points in sequence at Time Te.

Next, in Step S1143b, the route calculation unit 114 calculates the number of the points existing between the point O (T0) and the point O (Te) in the first points in sequence. Next, in Step S1143c, the route calculation unit 114 calculates the number of the points existing between the point N (T0) and the point N (Te) in the second points in sequence. Next, in Step S1143d, the route calculation unit 114 compares the number of the points in the first points in sequence obtained in Step S1143b with the number of the points in the second points in sequence obtained in Step S1143c. If the number of the points in the first points in sequence is equal to or larger than the number of the points in the second points in sequence, the operation of the route calculation unit 114 proceeds to Step S1143e. In Step S1143e, the route calculation unit 114 extracts the points existing between the point O (T0) and the point O (Te) in the first points in sequence as the reference points B (t).

In Step S1143d, if the number of the points in the first points in sequence is less than the number of the points in the second points in sequence, the operation of the route calculation unit 114 proceeds to Step S1143f. In Step S1143f, the route calculation unit 114 extracts the points existing between the point N (T0) and the point N (Te) in the second points in sequence as the reference points B (t). As described above, the route calculation unit 114 according to the present embodiment extracts the sequence of the reference points B (t) from the points in sequence that have a larger number of points in a predetermined section out of the first points in sequence and the second points in sequence. In other words, the route calculation unit 114 according to the present embodiment extracts the sequence of the reference points B (t) from the points in sequence that have a higher density of the points in a predetermined section out of the first points in sequence and the second points in sequence. The operation of the route calculation unit 114 after Step S1144 is the same as the operation of the route calculation unit 114 according to Embodiment 2.

In the route generation device 110 and the travel control device 100 according to the present embodiment, the route calculation unit 114 operates as described above. According to the route generation device 110 and the travel control device 100 of the present embodiment, it is possible to easily generate an optimal target route at the time of the lane change even when the arrangement interval of points included in the first points in sequence is different from the arrangement interval of points included in the second points in sequence. As a result, the discomfort of the passenger can be reduced. Also, the route generation device 110 and the travel control device 100 according to the present embodiment extract the reference points B (t) from the points in sequence that have a narrower arrangement interval between the points out of the first points in sequence or the second points in sequence. Then, each of the target points R (t) corresponding to each of the reference points B (t) are generated. Therefore, according to the route generation device 110 and the travel control device 100 of the present embodiment, it is possible to generate an appropriate route without decreasing the arrangement density of the target points R (t) in the third points in sequence representing the target route of the lane change. In addition, the route generation device 110 and the travel control device 100 according to the present embodiment have the effects described in Embodiment 1 and Embodiment 2.

REFERENCE SIGNS LIST 1, 1a, 1b user's vehicle,
2 GPS receiver,
3 map distribution device,
4 speed sensor,
5 yaw rate sensor,
6 driving support ECU,
7 steering ECU,
8 steering mechanism,
10 travel control system,
21a, 21b, 21c lane line,
22a first route,
22b second route,
100 travel control device,
110 route generation device,
111 position obtaining unit,
112 first route extraction unit,
113 second route extraction unit,
114 route calculation unit,
120 control amount calculation unit,
210 speed detection unit,
220 yaw rate detection unit,
230 position detection unit,
240 map distribution unit,
300 steering unit

What is claimed is:

1. A route generation device to generate a target route for when a vehicle makes a lane change, the device comprising:
processing circuitry configured to
obtain location information of the vehicle;
extract, based on the location information of the vehicle and map information obtained from outside the vehicle, a first target route as, from a current location of the vehicle, first points in sequence on assumption that a first path in a first case where the vehicle continues to travel in a lane in which the vehicle is currently traveling before starting the lane change;
extract, based on the location information of the vehicle and the map information, a second target route as second points in sequence on a second path in a second case where the vehicle is currently traveling in an adjacent lane in which the vehicle travels after completing the lane change, and the vehicle continues to travel in the adjacent lane, and
calculate a third route as the target route for when the vehicle makes the lane change as third points in sequence based on the first points in sequence and the second points in sequence,
wherein the processing circuitry, to calculate the target route:
generates a plurality of reference points on one of a first line connecting the first points in sequence and a second line connecting the second points in sequence,
generates a plurality of corresponding points. some or all of which are in one-to-one correspondence to the reference points on the other one of the first line connecting the first points in sequence and the second line connecting the second points in sequence, and
generates each point to be included in the third points in sequence as a. target point on a third line connecting one of the reference points and one of the corresponding points which correspond to each other, and
wherein the vehicle includes a steering device that is controlled based on the target route generated by the processing circuitry.

2. The route generation device according to claim 1, wherein the processing circuitry calculates a position of the target point such that a ratio of a first distance between the reference point and the target point to a second distance between the reference point and the corresponding point changes in accordance with an elapsed time after the vehicle starts the lane change.

3. The route generation device according to claim 2, wherein the processing circuitry calculates the position of the target point such that a locus of a change in the ratio with respect to the elapsed time after the vehicle starts the lane change will be a clothoid curve.

4. The route generation device according to claim 1, wherein the processing circuitry extracts the reference points from one of the first points in sequence and the second points in sequence and extracts a point nearest to each of the reference points as the corresponding point from the other one of the first points in sequence and the second points in sequence.

5. The route generation device according to claim 2, wherein the processing circuitry extracts the reference points from one of the first points in sequence and the second points in sequence and extracts a point nearest to each of the reference points as the corresponding point from the other one of the first points in sequence and the second points in sequence.

6. The route generation device according to claim 3, wherein the processing circuitry extracts the reference points from one of the first points in sequence and the second points in sequence and extracts a point nearest to each of the reference points as the corresponding point from the other one of the first points in sequence and the second points in sequence.

7. The route generation device according to claim 1, wherein the processing circuitry extracts the reference points from one of the first points in sequence and the second points in sequence and calculates a nearest point on a line connecting the points in sequence of the other one of the first points in sequence and the second points in sequence for each of the reference points as the corresponding point.

8. The route generation device according to claim 2, wherein the processing circuitry extracts the reference points from one of the first points in sequence and the second points in sequence and calculates a nearest point on a fourth line connecting the points in sequence of the other one of the first points in sequence and the second points in sequence for each of the reference points as the corresponding point.

9. The route generation device according to claim 3, wherein the processing circuitry extracts the reference points from one of the first points in sequence and the second points in sequence and calculates a nearest point on a fourth line connecting the points in sequence of the other one of the first points in sequence and the second points in sequence for each of the reference points as the corresponding point.

10. The route generation device according to claim 1, wherein the processing circuitry extracts the reference points from one of the first points in sequence and the second points in sequence and calculates, as the corresponding point, a foot of a vertical line drawn from a corresponding one of the reference points to a straight line passing through a plurality of points included in the points in sequence of the other one of the first points in sequence and the second points in sequence.

11. The route generation device according to claim 2, wherein the processing circuitry extracts the reference points from one of the first points in sequence and the second points in sequence and calculates, as the corresponding point, a foot of a vertical line drawn from a correspondin one of the reference points to a straight line passing through a plurality of points included in the points in sequence of the other one of the first points in sequence and the second points in sequence.

12. The route generation device according to claim 3, wherein the processing circuitry extracts the reference points from one of the first points in sequence and the second points in sequence and calculates, as the corresponding point, a foot of a vertical line drawn from corresponding one of the reference points to a straight line passing through a plurality of points included in the points in sequence of the other one of the first points in sequence and the second points in sequence.

13. The route generation device according to claim 7, wherein the processing circuitry extracts the reference points from points in sequence that have a number of the points in sequence at or above a predetermined number in a predetermined section out of the first points in sequence or the second points in sequence.

14. The route generation device according to claim 8, wherein the processing circuitry extracts the reference points from points in sequence that have a number of the points in sequence at or above a predetermined number in a predetermined section out of the first points in sequence or the second points in sequence.

15. The route generation device according to claim 10, wherein the processing circuitry extracts the reference points from points ifs sequence that have a number of the points in sequence at or above a predetermined number in a predetermined section out of the first points in sequence or the second points in sequence.

16. The route generation device according to claim 11, wherein the processing circuitry extracts the reference points from points in sequence that have a number of the points in sequence at or above a predetermined number in a predetermined section out of the first points in sequence or the second points in sequence.

17. A travel control device comprising:
the route generation device according to claim 1; and
a control amount calculation circuit to calculate a target steering angle, as a control amount of the vehicle, for the vehicle to travel along said target route generated by the route generation device.

18. A travel control device comprising:
the route generation device according to claim 2; and
a control amount calculation circuit to calculate a target steering angle, as a control amount of the vehicle, for the vehicle to travel along said target route generated by the route generation device.

19. A travel control device comprising:
the route generation device according to claim 3; and
a control amount calculation circuit to calculate a target steering angle, as a control amount of the vehicle, for the vehicle to travel along said target route generated by the route generation device.

20. A route generation method of generating a target route for when a vehicle makes a lane change, the method comprising:
obtaining location information of the vehicle;
extracting, based on the location information of the vehicle and map information obtained from outside the vehicle, a first target route as, from a current location of the vehicle, first points in sequence on a first path in a first case where the vehicle continues to travel in a lane in which the vehicle is currently traveling before starting the lane change;
extracting, based on the location information of the vehicle and the map information, a second target route as second points in sequence on an a second path in a second case where the vehicle is currently traveling in an adjacent lane in which the vehicle travels after completing the lane change, and the vehicle continues to travel in the adjacent lane, and
calculating a third route as the target route for when the vehicle makes the lane change as third points in sequence based on the first points in sequence and the second points in sequence,
wherein said calculating the target route as the third points in sequence includes:
generating a plurality of reference points on one of a first line connecting the first points in sequence and a second line connecting the second points in sequence;
generating a plurality of corresponding points in one-to-one correspondence to the reference points on the other one of the first line connecting the first points in sequence and the second line connecting the second points in sequence; and
generating each point to be included in the third points in sequence as a target point on a third line connecting one of the reference points and one of the corresponding points which correspond to each other, and
wherein the vehicle includes a steering device that is controlled based on the target route generated by the processing circuitry.

* * * * *